United States Patent
Appelt

[15] 3,652,890
[45] Mar. 28, 1972

[54] X-RAY TUBE WITH ROTARY ANODES

[72] Inventor: Gunther Appelt, Erlangen, Germany
[73] Assignee: Siemens Aktiengesellschaft, Erlangen, Germany
[22] Filed: Feb. 16, 1970
[21] Appl. No.: 11,439

[30] Foreign Application Priority Data

Mar. 28, 1969 Germany ..................P 19 15 958.1

[52] U.S. Cl. ..............................................313/60, 313/149
[51] Int. Cl. ..........................................................H01j 35/10
[58] Field of Search.....................313/55, 60, 146, 149, 152, 313/330; 308/10

[56] References Cited

UNITED STATES PATENTS 2,280,886  4/1942  Brace.........................................313/60
2,315,280  3/1943  Skehan......................................313/60

Primary Examiner—Roy Lake
Assistant Examiner—Darwin R. Hostetter
Attorney—Richards & Geier

[57] ABSTRACT

X-ray tube with rotary anodes wherein the axis of the anode runs in ball bearings the casings of which consist of metal sheets joined by straps, is particularly characterized in that one sheet of casing has molded straps and consists of a hardenable material while the other sheet consists of a material providing a lubricating coating.

8 Claims, 2 Drawing Figures

PATENTED MAR 28 1972

3,652,890

INVENTOR.
g. Appelt
BY
Richards & Geier
attorneys

X-RAY TUBE WITH ROTARY ANODES

This invention relates to X-ray tubes with rotary anodes wherein the axis of the anode runs in ball bearings the casings of which consist of metal sheets held together by straps.

The bearings of X-ray tubes are subjected to very great strains since they must run in vacuum spaces while being affected by extreme temperature changes. Since X-ray tubes are provided as a rule with fused off evacuated glass bulbs, the bearings must also require no attendance. The opening of the bulb for repairs or cleaning would require the breaking up and thus the destruction of the tube.

Now in use are bearings without casings wherein the balls rub against each other and bearings with one part casings which have sufficient strength but wear out quickly. In addition, casings are now used for X-ray tubes with rotary anodes, which consist of two ring-shaped preferably stamped metal sheets lying against each other. They are held together by strips which are applied upon the edge of one part and are bent around the outer edge of the other part. Recesses in which the balls are inserted are provided between the location in which the strips are located. These constructions were found to have the drawback that parts of the ball casings change their shape after a while or become loose through the bending of strips. In most cases this results in the immediate breakage of parts of the casing. The loose parts block as a rule the bearing, in that they touch other parts of the bearing or the tube. At the present time this is a cause of breakage of many tubes.

In order to make longer the life of the tubes attempts have been made to prevent the loosening of the parts of the casing by the use of hardening materials. However, the desired results were not fully attained thereby. It was found that although the holding became strong, the increased friction of the hardened material resulted in additional wear of the bearing, thus shortening its life duration and providing unsatisfactory results.

An object of the present invention is the provision of X-ray tubes with rotary anodes which have a longer duration than those now in existence.

Other objects of the present invention will become apparent in the course of the following specification.

In the accomplishment of the objectives of the present invention it was found desirable to make the two parts of the casings of the anode bearings of different materials, whereby one sheet part has moulded straps and consists of a hardenable material, while the other part consists of a material serving as a lubricant.

In such construction the greater strength of the hardenable material is utilized for the holding while to diminish friction the balls are lubricated by the rub-off of the lubricating material. The use of a nickel-beryllium alloy with 1.9–2.1% Be, 1% Mn, the rest being Ni, as the hard material and pure silver as the lubricating material, was found to lengthen the duration of the tubes by many times in comparison with tubes the bearings of which have usual casings consisting of deep drawn iron sheets. As other suitable hardenable materials it is possible to use alloys of the type sold in trade under the trademark Thermelast 2602 and consisting of 0.2% Be, 26% Ni, 40% Co, 12% Cr, 11% Fe, 4% Mo, 4% W and 1% Ti. The only requirement is that the hardness and the firmness of the material should be able to withstand the effects of temperatures which arise during the manufacture and operation of X-ray tubes. Preferably an alloy is chosen the hardening temperature of which can be also applied to the other material of the ball casing. Alloys of silver can be also used as the lubricating materials, such as silver-copper alloys containing 85–92% Ag and 8–15% Cu. Also iron,- such as deep drawn iron sheets,- was found to have adequate capacity to lubricate. The lubricating material which is used in X-ray tubes with rotary anodes must have high temperature resistance at low steam pressure and adequate rub-off resistance despite loss of lubricating material.

The invention will appear more clearly from the following detailed description when taken in connection with the accompanying drawing showing by way of example only, a preferred embodiment of the inventive idea.

Figure 1:
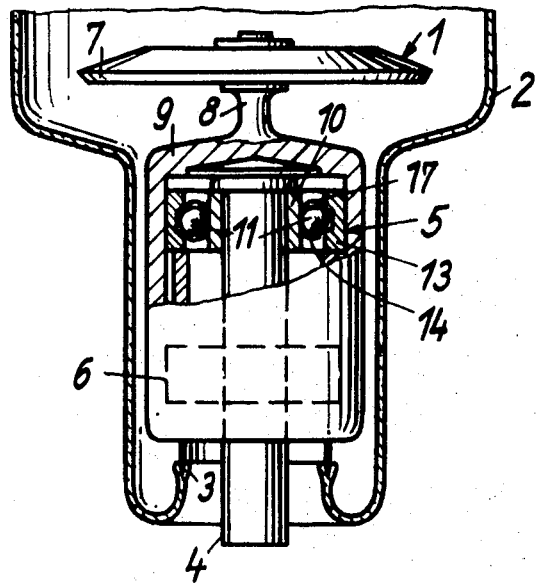
FIG. 1 is a section through an X-ray tube with rotary anodes constructed in accordance with the present invention.

The rotary anode 1 is located in an evacuated glass bulb 2 only a part of which is shown in FIG. 1. The cathode is located in the upper part of the bulb which is not illustrated. The anode 1 is connected with the bulb 2 by an anode axle or stem 4 glass-connected at 3. Ball bearings 5 and 6 are located at the connections between the anode 1 and the stem 4. The rotary anode itself consists of an anode plate 7 fixed upon the upper end of the axle 8. The axle 8 carries at its other end the rotor 9 which along with a starter (not shown) enclosing the bulb 2 constitutes the drive for the anode 1. The two ball bearings 5 and 6 are located within the rotor 9. FIG. 1 shows a section of the bearing 5 while the bearing 6 has been indicated merely by broken lines. The inner ball race 10 of the bearings is mounted upon the outer surface of the stem 4 while the outer ball race 13 engages the inner side of the rotor 9. Balls 11 which are held by the casing 12 are located between the two ball races 10 and 13.

Figure 2:
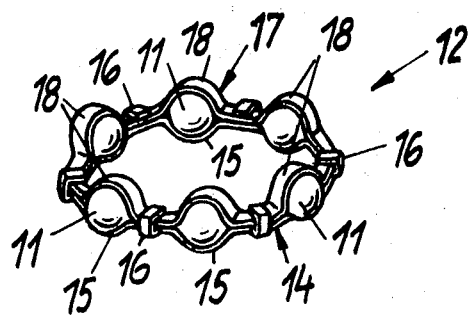
FIG. 2 is a perspective enlarged view of a ball casing used in the bearings of this tube.

The casing 12 which is better shown in an enlarged view in FIG. 2, consists of a part 14 having bendable straps 16 located between curved portions 15. The straps are bent upwardly and thus hold firmly the second casing portion 17. This portion has no straps between its curved portions 18, so that the bending of the straps 16 is not interfered with. The casing portion 14 provided with the straps 16 consists of a commercially available nickel-beryllium alloy having the required strength and containing 2%Be and 19%Mn, the balance being Ni. The other casing portion 17 capable of being lubricated consists of a silver-copper alloy with 92%Ag and 8%Cu.

I claim:

1. An X-ray tube comprising an evacuated bulb having a rotary anode, an axle carrying said anode and ball bearings enclosing said axle, said ball bearings having a casing consists of two shaped sheets, the balls of the ball bearings being located between said sheets, one of said sheets having molded straps engaging the other sheet, said one sheet consisting of a hardenable material, the other sheet consisting of a material capable of applying a lubricating coating.

2. An X-ray tube in accordance with claim 1, wherein said one sheet consists of a nickel-beryllium alloy with 0.2 to 2.1 percent beryllium.

3. An X-ray tube in accordance with claim 2, wherein said one sheet consists of a nickel-beryllium alloy with 2 percent beryllium.

4. An X-ray tube in accordance with claim 1, wherein said other sheet consists of a silver alloy.

5. An X-ray tube in accordance with claim 4, wherein said other sheet consists of a silver-copper alloy with 8–15% Cu.

6. An X-ray tube in accordance with claim 1, wherein said other sheet consists of pure silver.

7. An X-ray tube in accordance with claim 1, wherein said other sheet consists of iron.

8. An X-ray tube in accordance with claim 1, wherein said other sheet consists of deep drawn iron.

* * * * *